(12) United States Patent
Millhouse et al.

(10) Patent No.: US 10,963,884 B2
(45) Date of Patent: Mar. 30, 2021

(54) SYSTEMS AND METHODS FOR PROCESSING REIMBURSEMENT REQUESTS SUBMITTED BY RETAIL STORES TO DISTRIBUTION CENTERS

(71) Applicant: Walmart Apollo, LLC, Bentonville, AR (US)

(72) Inventors: Andrew B. Millhouse, Gilbert, AZ (US); Timothy J. Burleson, Bentonville, AR (US); John S. Meredith, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 143 days.

(21) Appl. No.: 16/291,539

(22) Filed: Mar. 4, 2019

(65) Prior Publication Data

US 2019/0340611 A1   Nov. 7, 2019

Related U.S. Application Data

(60) Provisional application No. 62/666,878, filed on May 4, 2018.

(51) Int. Cl.
*G06Q 20/40* (2012.01)
*G06Q 10/08* (2012.01)
(Continued)

(52) U.S. Cl.
CPC ......... *G06Q 20/405* (2013.01); *G06Q 10/087* (2013.01); *G06Q 10/0838* (2013.01); *G06Q 30/04* (2013.01); *G06F 3/0481* (2013.01)

(58) Field of Classification Search
CPC .... G06Q 20/40; G06Q 20/405; G06Q 10/087; G06Q 20/4012; G06Q 20/202;
(Continued)

(56) References Cited

U.S. PATENT DOCUMENTS 5,761,308 A * 6/1998 Torii ...................... G06Q 20/10
                                                          380/2
6,044,362 A * 3/2000 Neely ................ G06Q 20/0425
                                                          705/34

(Continued)

FOREIGN PATENT DOCUMENTS

CN        1728169        2/2006

OTHER PUBLICATIONS

PCT; App. No. PCT/US2019/029607; International Search Report and Written Opinion dated Jul. 15, 2019.

*Primary Examiner* — Andrew Joseph Rudy
(74) *Attorney, Agent, or Firm* — Fitch, Even, Tabin & Flannery, LLP

(57) ABSTRACT

In some embodiments, methods and systems are provided for processing reimbursement requests submitted by retail stores to distribution centers responsible for delivering products to the retail stores. A claim processing server is configured to analyze a reimbursement request, an associated electronic invoice, and a set of business rules, all of which are stored in electronic databases and obtained by the processing server. Based on this analysis, the claim processing server is programmed to either approve or deny the reimbursement request submitted by a retail store, and if the reimbursement request is approved, to generate a corrected invoice to be sent to the distribution center.

20 Claims, 7 Drawing Sheets

(51) Int. Cl.
*G06Q 30/04* (2012.01)
*G06F 3/0481* (2013.01)

(58) Field of Classification Search
CPC .... G06Q 10/08; G06Q 10/0838; G06Q 30/04; G06F 3/0481
USPC .......................................................... 705/28
See application file for complete search history.

(56) References Cited

U.S. PATENT DOCUMENTS

| | | | |
|---|---|---|---|
| 7,182,252 B1 * | 2/2007 | Cooper | G07F 19/00 235/379 |
| 7,370,005 B1 * | 5/2008 | Ham | G06Q 10/06315 705/28 |
| 7,430,527 B2 | 9/2008 | Chalmers | |
| 7,676,407 B2 * | 3/2010 | Van De Van | G06Q 40/00 705/35 |
| 7,797,204 B2 * | 9/2010 | Balent | G06Q 10/087 705/28 |
| 8,047,430 B2 * | 11/2011 | Hoffman | G06Q 20/40 235/379 |
| 8,108,265 B2 * | 1/2012 | Bonner | H04L 67/18 705/26.3 |
| 8,156,007 B1 * | 4/2012 | Anthony | G06Q 30/0601 705/26.1 |
| 8,311,895 B1 | 11/2012 | Murugan | |
| 8,332,282 B2 | 12/2012 | Siegel | |
| 8,396,755 B2 * | 3/2013 | Bonner | G06Q 30/08 705/26.3 |
| 8,533,074 B1 | 9/2013 | Ehrhardt | |
| 8,548,860 B2 | 10/2013 | Junger | |
| 8,646,685 B2 * | 2/2014 | Bishop | G06Q 30/06 235/379 |
| 8,712,887 B2 * | 4/2014 | DeGroeve | G06Q 20/40 705/35 |
| 9,697,548 B1 | 7/2017 | Jaff | |
| 9,984,351 B1 * | 5/2018 | Antony | G06Q 10/0837 |
| 10,176,501 B2 * | 1/2019 | Ramaratnam | G06Q 30/0633 |
| 10,489,787 B2 * | 11/2019 | Sheard | G06Q 20/227 |
| 2002/0007302 A1 | 1/2002 | Work | |
| 2004/0054575 A1 * | 3/2004 | Marshall | G06Q 30/0267 705/14.36 |
| 2007/0156582 A1 | 7/2007 | Bagheri | |
| 2008/0120129 A1 * | 5/2008 | Seubert | G06Q 10/10 705/35 |
| 2011/0071883 A1 * | 3/2011 | Warier | G06Q 10/04 705/7.31 |
| 2015/0100465 A1 * | 4/2015 | Dornbush | G06Q 10/087 705/28 |
| 2015/0127534 A1 * | 5/2015 | Bhambhani | G06Q 20/405 705/44 |
| 2015/0182696 A1 * | 7/2015 | Kelly | A61M 5/16804 604/503 |
| 2016/0070560 A1 | 3/2016 | Chase | |
| 2016/0110785 A1 * | 4/2016 | Ramaratnam | G06Q 30/0609 705/26.35 |
| 2016/0328781 A1 * | 11/2016 | Patel-Zellinger | G06Q 30/0635 |
| 2017/0017922 A1 | 1/2017 | Wicks | |
| 2017/0039559 A1 * | 2/2017 | Frieden | G06Q 20/382 |
| 2020/0175496 A1 * | 6/2020 | Finke | G06Q 20/3274 |

\* cited by examiner

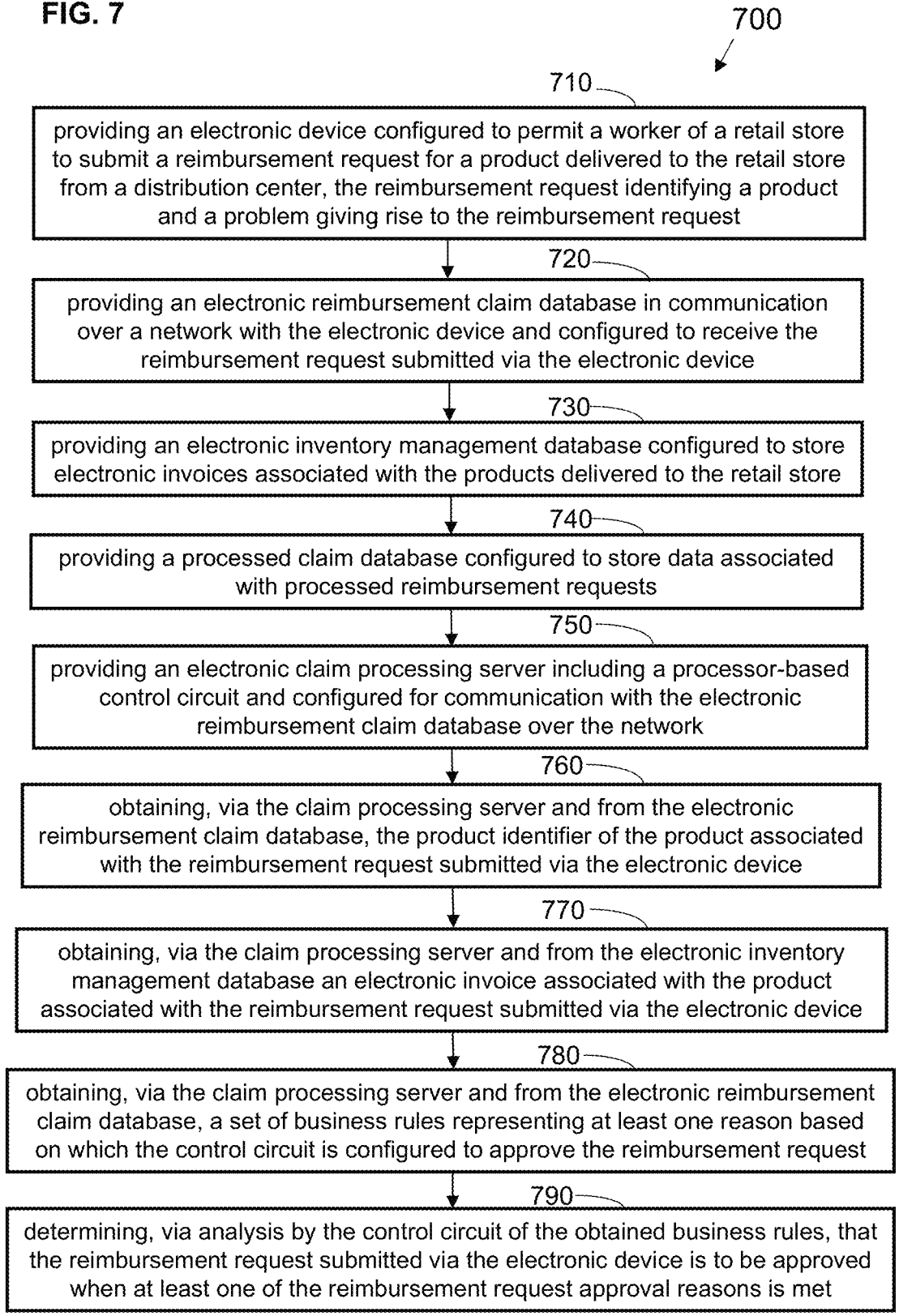

SYSTEMS AND METHODS FOR PROCESSING REIMBURSEMENT REQUESTS SUBMITTED BY RETAIL STORES TO DISTRIBUTION CENTERS

CROSS-REFERENCE TO RELATED APPLICATIONS

This application claims the benefit of U.S. Provisional Application No. 62/666,878, filed May 4, 2018, which is incorporated herein by reference in its entirety.

TECHNICAL FIELD

This invention relates generally to reimbursement requests submitted by retail stores to distribution centers responsible for delivering products to the retail stores and, in particular, to processing the reimbursement requests based on a set of business rules and either approving or denying such reimbursement requests.

BACKGROUND

Major retail stores typically receive products from product distribution centers via delivery by carriers (typically trucks). Generally, the quantity of the products delivered corresponds to the quantity indicated on the documentation (e.g., purchase order, invoice, etc.) associated with the delivery, and the condition of the products delivered is new and undamaged, such that the products can be displayed and sold to the customers of the retail store. It is not uncommon for carriers to deliver to the retail store a number of product that is greater than or less than the number of products ordered by the store, or to deliver products that have been damaged during delivery, or to deliver products that are unsuitable for sale to consumers for any other reason (e.g., past expiration date, poor quality, etc.). In such situations, retail stores typically submit reimbursement requests to the distribution centers in order to rectify the mis-shipment condition.

Conventional systems for processing reimbursement requests rely on facsimile and/or electronic mail. For example, a retail store typically submits a reimbursement request by manually assembling papers (e.g., invoice, photographs, etc.) and faxing the paperwork to the distribution center, where a worker at the distribution center would review the reimbursement request and would then notify the retail store by facsimile that whether the reimbursement request was approved or denied by the distribution center. Such conventional systems are time consuming due to the many manual steps involved and are subject to human error.

BRIEF DESCRIPTION OF THE DRAWINGS

Disclosed herein are embodiments of systems, apparatuses, methods, and systems pertaining to processing reimbursement requests submitted by retail stores to distribution centers responsible for delivering products to the retail stores. This description includes drawings, wherein:

FIG. 7 is a flow chart diagram of a process of processing reimbursement requests submitted by retail stores to distribution centers responsible for delivering products to the retail stores in accordance with some embodiments.

Figure 1:
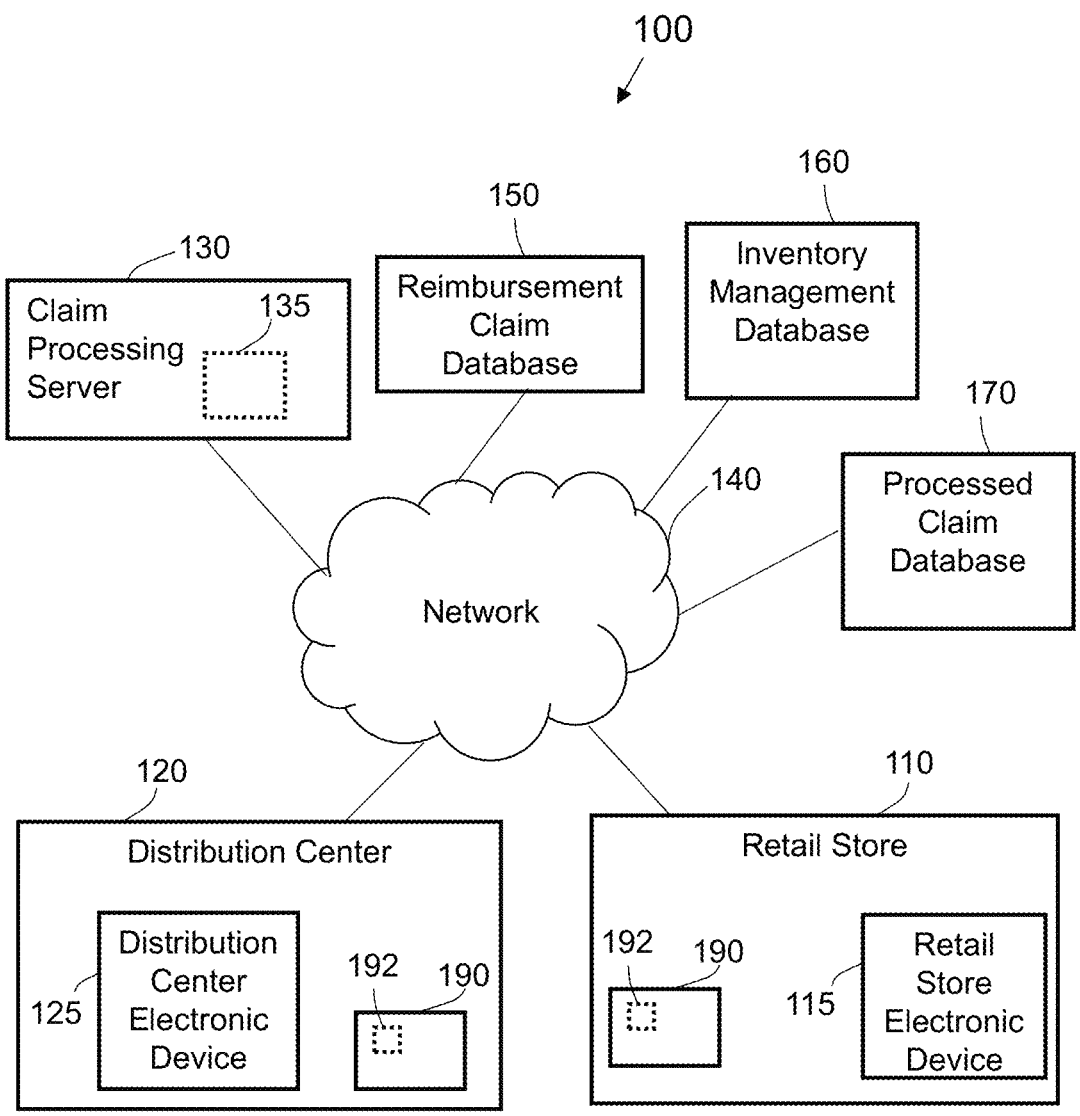
FIG. 1 is a diagram of a system of processing reimbursement requests submitted by retail stores to distribution centers responsible for delivering products to the retail stores in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for processing reimbursement requests submitted by retail stores to distribution centers responsible for delivering products to the retail stores. A claim processing server is configured to analyze a reimbursement request, an associated electronic invoice, and a set of business rules and, based on this analysis, to approve or deny the reimbursement request submitted by a retail store.

In some embodiments, a system for processing reimbursement requests submitted by retail stores to distribution centers responsible for delivering products to the retail stores includes at least one electronic device configured to permit a worker of a retail store to submit a reimbursement request in association with a product delivered to the retail store from a distribution center. The reimbursement request includes a product identifier that identifies a product for which the reimbursement request is being submitted and descriptive data identifying a problem giving rise to the reimbursement request. The system further includes an electronic reimbursement claim database in communication over a network with the at least one electronic device and configured to receive the reimbursement request submitted via the at least one electronic device, an electronic inventory management database configured to store electronic invoices associated with the products delivered to the retail store, an electronic processed claim database configured to store data associated with processed reimbursement requests, and a claim processing server including a processor-based control circuit and configured for communication with the electronic reimbursement claim database over the network. The claim processing server is configured to: obtain, from the electronic reimbursement claim database, the product identifier of the product associated with the reimbursement request submitted via the at least one electronic device and obtain, from the electronic inventory management database and based on the obtained electronic identifier, an electronic invoice associated with the product associated with the reimbursement request submitted via the at least one electronic device. The claims processing server is also configured to obtain, from the electronic reimbursement claim database, a set of business rules representing at least one reason based on which the control circuit is configured to approve the reimbursement request, the reimbursement request approval reasons including at least one of: whether the product associated with the reimbursement request is of below standard quality, whether the product associated with the reimbursement request is damaged; whether the product associated with the reimbursement request is past expiration date; whether a total number of units of the product associated with the reimbursement request delivered to the distribution center does not match a total number of units of the product indicated on the electronic invoice. The claims processing server is also configured to analyze the obtained business rules and determine that the reimbursement request submitted via the at least one electronic device is to be approved when at least one of the reimbursement request approval reasons is met and, in response to a determination by the control circuit that the reimbursement request is to be approved, generate: a corrected invoice directed to the distribution center; and event data indicating approval of the reimbursement request and the generation of the corrected invoice directed to the distribution center; and transmit an alert including the corrected invoice over the network to a computing device of the distribution center; and transmit the event data to the electronic processed claim database for storage.

In some embodiments, a method of processing reimbursement requests submitted by retail stores to distribution centers responsible for delivering products to the retail stores includes: providing at least one electronic device configured to permit a worker of a retail store to submit a reimbursement request in association with a product delivered to the retail store from a distribution center, the reimbursement request including a product identifier that identifies a product for which the reimbursement request is being submitted and descriptive data identifying a problem giving rise to the reimbursement request; providing an electronic reimbursement claim database in communication over a network with the at least one electronic device and configured to receive the reimbursement request submitted via the at least one electronic device; providing an electronic inventory management database configured to store electronic invoices associated with the products delivered to the retail store; providing an electronic processed claim database configured to store data associated with processed reimbursement requests; providing a claim processing server including a processor-based control circuit and configured for communication with the electronic reimbursement claim database over the network; obtaining, via the claim processing server and from the electronic reimbursement claim database, the product identifier of the product associated with the reimbursement request submitted via the at least one electronic device; obtaining, via the claim processing server and from the electronic inventory management database and based on the obtained electronic identifier, an electronic invoice associated with the product associated with the reimbursement request submitted via the at least one electronic device; obtaining, via the claim processing server and from the electronic reimbursement claim database, a set of business rules representing at least one reason based on which the control circuit is configured to approve the reimbursement request, the reimbursement request approval reasons including at least one of: whether the product associated with the reimbursement request is of below standard quality, whether the product associated with the reimbursement request is damaged; whether the product associated with the reimbursement request is past expiration date; whether a total number of units of the product associated with the reimbursement request delivered to the distribution center does not match a total number of units of the product indicated on the electronic invoice; determining, via analysis by the control circuit of the obtained business rules, that the reimbursement request submitted via the at least one electronic device is to be approved when at least one of the reimbursement request approval reasons is met; in response to a determination by the control circuit that the reimbursement request is to be approved, generating: a corrected invoice directed to the distribution center; and event data indicating approval of the reimbursement request and the generation of the corrected invoice directed to the distribution center; transmitting, from the claim processing server, an alert including the corrected invoice over the network to a computing device of the distribution center; and transmitting, from the claim processing server, the event data to the electronic processed claim database for storage.

FIG. 1 shows an embodiment of a system 100 for facilitating submission and processing of reimbursement requests by retail stores 110 to distribution centers 120 responsible for delivering products to the retail stores 110. A retailer or retail store 110 will be understood to mean any entity operating as a brick-and-mortar physical store and/or a website accessible, for example, via the internet or another network, by way of which products may be ordered by customers. A distribution center 120 will be understood to mean any entity (operated by the retailer or a third party) that manufactures, distributes, and/or sorts products that are delivered by carriers to the retail stores 110. A customer will be understood as an individual or a business entity. Exemplary products that may be transported from distribution centers 120 to the retail stores 110 may include, but are not limited to, general-purpose customer goods, as well as consumable products, such as medications, food items, and dietary supplements.

The exemplary system 100 depicted in FIG. 1 includes a claim processing server 130, which may be implemented as one computer/server at one facility, or as multiple interconnected computers/servers stored at multiple facilities operated by or for the retailer. In some embodiments, the claim processing server 130 is a stationary or portable electronic device, for example, a desktop computer, a laptop computer, a tablet, a mobile phone, or any other electronic device including a processor-based control circuit (i.e., control unit). In the embodiment of FIG. 1, the claim processing server 130 is configured for data entry and processing as well as for communication with other devices of system 100 via a network 140.

The network 140 may be a wide-area network (WAN), a local area network (LAN), a personal area network (PAN), a wireless local area network (WLAN), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, as will be described below and shown in FIG. 1, the claim processing server 130 is configured to access multiple electronic databases and communicate with electronic devices at the retail store 110 and at the distribution center 120 over the network 140 to facilitate the processing of reimbursement requests by the retail stores 110 to the distribution centers 120.

In the exemplary embodiment illustrated in FIG. 1, the claim processing server 130 is coupled to a reimbursement claim database 150 via the network 140. In some embodiments, the reimbursement claim database 150 may be configured to store information associated with the reimbursement claims submitted by the retail stores 110 against the distribution centers 120. Generally, in some embodiments, the reimbursement claim database 150 stores electronic information including but not limited to: reimbursement requests (including, for example, descriptive data identifying a problem giving rise to the reimbursement request) submitted by the retail store 110 against the distribution centers 120, configuration tables including business rules that facilitate the claim processing server 130 in determining whether or not to approve a given reimbursement request, and product identifiers 192 of products 190 associated with the reimbursement requests. The products 190 may be identified in the reimbursement claim database 150 by way of unique product identifiers 192 (e.g., barcode, serial number, RFID (radio frequency identification), SKU (stock keeping unit number), or the like). The reimbursement claim database 150 may be stored, for example, on non-volatile storage media (e.g., a hard drive, flash drive, or removable optical disk) internal or external to the claim processing server 130, or internal or external to computing devices separate and distinct from the claim processing server 130. It will be appreciated that the reimbursement claim database 150 may likewise be cloud-based.

In the exemplary embodiment illustrated in FIG. 1, the claim processing server 130 is further coupled to an inventory management database 160 over the network 140. In some embodiments, the inventory management database 160 may be configured to store electronic invoice information that reflects the products 190 delivered to the retail store 110 from the distribution center 120. In some embodiments, the inventory management database 160 contains information (e.g., perpetual inventory data) regarding the products 190 present in the product delivery area, stock room, sales floor, the products 190 present in the sale/return/claim areas of the retail store 110, as well information regarding the products 190 delivered to the retail store 110 from one or more distribution centers 120. The products 190 may be identified in the inventory management database 160 by way of unique product identifiers (e.g., barcode, serial number, RFID (radio frequency identification), SKU (stock keeping unit number), or the like). The inventory management database 160 may be stored, for example, on non-volatile storage media (e.g., a hard drive, flash drive, or removable optical disk) internal or external to the claim processing server 130, or internal or external to computing devices separate and distinct from the claim processing server 130. It will be appreciated that the inventory management database 160 may likewise be cloud-based.

In the exemplary embodiment illustrated in FIG. 1, the claim processing server 130 is further coupled to a processed claim database 170 over the network 140. In some embodiments, the processed claim database 170 may be configured to store information associated with the reimbursement requests (i.e., reimbursement claims) submitted by the retail stores 110 against the distribution centers 120. In some embodiments, the processed claim database 170 contains information identifying (e.g., by serial number or another unique identifying) all reimbursement requests submitted by the retail stores 110 against the distribution centers 120, as well as information (i.e., event data) indicating whether each reimbursement request has been approved or denied by the claim processing server 130, whether a corrected invoice was generated based on the approval of a given reimbursement request, and/or credit/debit amounts relative to the retail store 110 and the distribution center 120 reflected in the corrected invoice. The processed claim database 170 may be stored, for example, on non-volatile storage media (e.g., a hard drive, flash drive, or removable optical disk) internal or external to the claim processing server 130, or internal or external to computing devices separate and distinct from the claim processing server 130. It will be appreciated that the processed claim database 170 may likewise be cloud-based.

Notably, the claim processing server 130 is shown in FIG. 1 in communication with three separate electronic databases (i.e., reimbursement claim database 150, inventory management database 160, and processed claim database 170 over the network 140 by way of example only. Those of ordinary skill in the art will appreciate that the reimbursement claim database 150, inventory management database 160, and processed claim database 170 may be configured as one comprehensive database such that the claim processing server 130 may be coupled via the network 140 to only one electronic database.

In the exemplary embodiment illustrated in FIG. 1, the retail store 110 accesses the claim processing server 130 over the network 140 via a retail store electronic device 115, which may be a stationary, portable, and/or hand-held electronic device, for example, a desktop computer, a laptop computer, a tablet, a mobile phone, or any other electronic, processor-based device configured for data entry and communication with the claim processing server 130 over the network 140. Similarly, in the exemplary embodiment illustrated in FIG. 1, a distribution center 120 accesses the claim processing server 130 over the network 140 via a distribution center electronic device 125, which may be a stationary, portable, and/or hand-held electronic device, for example, a desktop computer, a laptop computer, a tablet, a mobile phone, or any other electronic, processor-based device configured for data entry and communication with the claim processing server 130 over the network 140.

In some aspects, when a user at the retail store electronic device 115 is connecting over the network 140 to the claim processing server 130, the claim processing server 130 may request a verification of the identity (e.g., username/password) of the user of the retail store electronic device 115. The claim processing server 130 may first verify the identity of the user of the retail store electronic device 115 (e.g., by comparing the username/password data entered by the user against username/password data (associated with workers of the retail store 110) stored in the reimbursement claim database 150). In one aspect, after the user of the retail store electronic device 115 is verified, the claim processing server 130 retrieves account information stored in the reimbursement claim database 150 in association with the retail store 110.

Similarly, in some aspects, when a user as the distribution center electronic device 125 connecting over the network 140 to the claim processing server 130, the claim processing server 130 may request a verification of the identity (e.g., username/password) of the user of the distribution center electronic device 125. The claim processing server 130 may first verify the identity of the user of the distribution center electronic device 125 (e.g., by comparing the username/password data entered by the user against username/password data (associated with workers at the distribution center 120) stored in the reimbursement claim database 150). In one aspect, after the user of the distribution center electronic device is verified, the claim processing server 130 may retrieve account information stored in the reimbursement claim database 150 in association with the distribution center 120.

In some aspects, the claim processing server 130 is configured to enable the users of the retail store electronic devices 115 associated with the retail stores 110 to enter electronic data pertaining to their reimbursement requests (based on various delivery-associated and/or product-associated deficiencies that may be attributable by the retail stores 110 to the distribution centers 120) by generating an internet-based form (i.e., graphical interface 135) accessible by the workers of the retail stores 110 via retail store electronic devices 115 that are logged in to the claim processing server 130. In some embodiments, the graphical interface 135 is configured to permit the workers of the retail stores 110 to submit their reimbursement requests without having to log in to the claim processing server 130 with their individual credentials.

Figure 3:
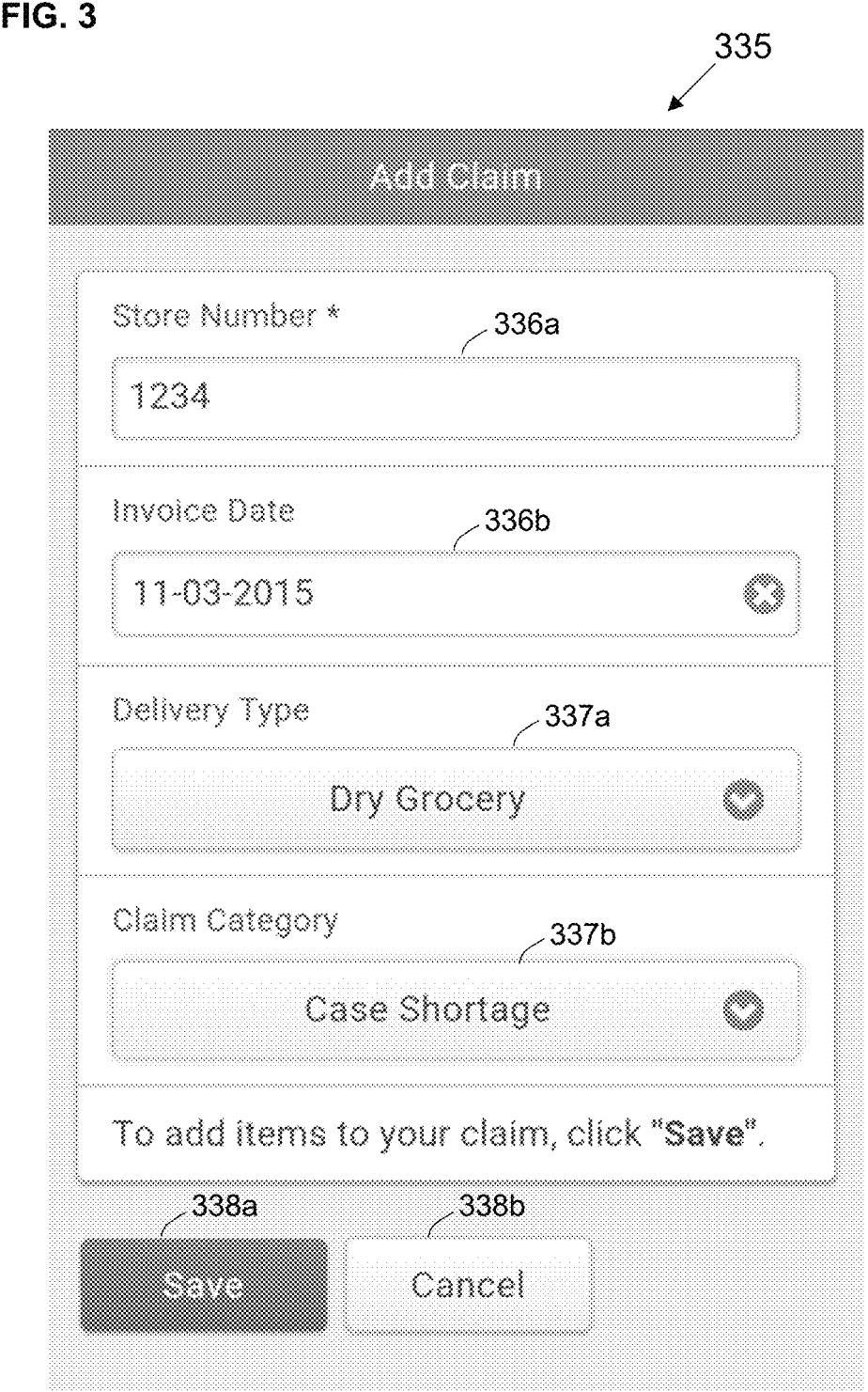
FIG. 3 is a screen shot of an exemplary reimbursement request submission graphical interface of the system of FIG. 1 in accordance with some embodiments.

A portion of an exemplary graphical interface 335 is illustrated in FIG. 3. In some aspects, the graphical interface 335 includes one or more fillable text input fields 336, drop-down menu fields 337, and graphical button fields 338 that permit a user (e.g., worker) at a retail store 110 to enter electronic data relating to a reimbursement request being submitted by the retail store 110 with respect to a distribution center 120. In some embodiments, instead of being an internet-based form having a defined uniform resource locator (URL) address and accessible via an internet browser of the retail store electronic device 115, the graphical interface 335 is generated within a mobile application (app) installed on the retail store electronic device 115 and configured to display various text input fields, drop-down menu fields, and/or graphical input fields that enable the user of the retail store electronic device 115 to enter and/or modify and/or submit a reimbursement request to a distribution center 120 with respect to one or more products 190 delivered from the distribution center 120 to the retail store 110 in one or more deliveries.

In some embodiments, when submitting a new reimbursement request using the graphical interface 335, the user of the retail store electronic device 115 is permitted to specify various parameters relating to the reimbursement request. For example, with reference to FIG. 3, the worker of the retail store 110 may use the retail store electronic device 115 to enter, via one or more of the above-described editable fields (e.g., 336, 337, and/or 339) of the exemplary graphical interface 335, electronic data including but not limited to: information associated with the retail store 110 (e.g., "Store Number," field 336a), information associated with the electronic invoice (e.g., "Invoice Date," field 336b), information associated with the delivery (e.g., "Delivery Type," field 337a), and information associated with the reimbursement claim classification (e.g., "Claim Category," field 337b). In addition, the exemplary graphical interface 335 illustrated in FIG. 3 includes a graphical "Save" button 338a that enables the user of the retail store electronic device 115 to save the reimbursement request, and a graphical "Cancel" button 338b that enables the user of the retail store electronic device 115 to cancel the reimbursement request. In some embodiments, the graphical interface 335 includes graphical input buttons that enable the user of the retail store electronic device 115 to upload photographs of products 190 and/or boxes and/or pallets giving rise to the reimbursement request (e.g., due to poor quality, damage, shortage, overage, mislabels, expired sell by date, etc.).

In the graphical interface illustrated in FIG. 3, the Store Number entered by the user of the retail store electronic device 115 into input field 336a is 1234, the Invoice Date entered into input field 336b is 11-03-2015, the Delivery Type entered into drop-down menu 337a is "Dry Grocery," and the Claim Category entered into drop-down menu 337b is "Case Shortage." It will be appreciated that the values and selections entered into the input fields 336a and 336b and into the drop-down menus 337a and 337b are shown by way of example only and other values (e.g., "home goods," "deli," "canned goods" instead of "dry grocery," or "poor quality," "damage," "past expiration date" instead of "case shortage," etc.) may be entered as applicable to a given reimbursement request. In the embodiment shown in FIG. 3, after the Store Number, Invoice Date, Claim Type, and Claim Category are entered by the user of the retail store electronic device 115 into the graphical interface 335, an interface 435 illustrated in FIG. 4 is generated for the user.

Figure 4:
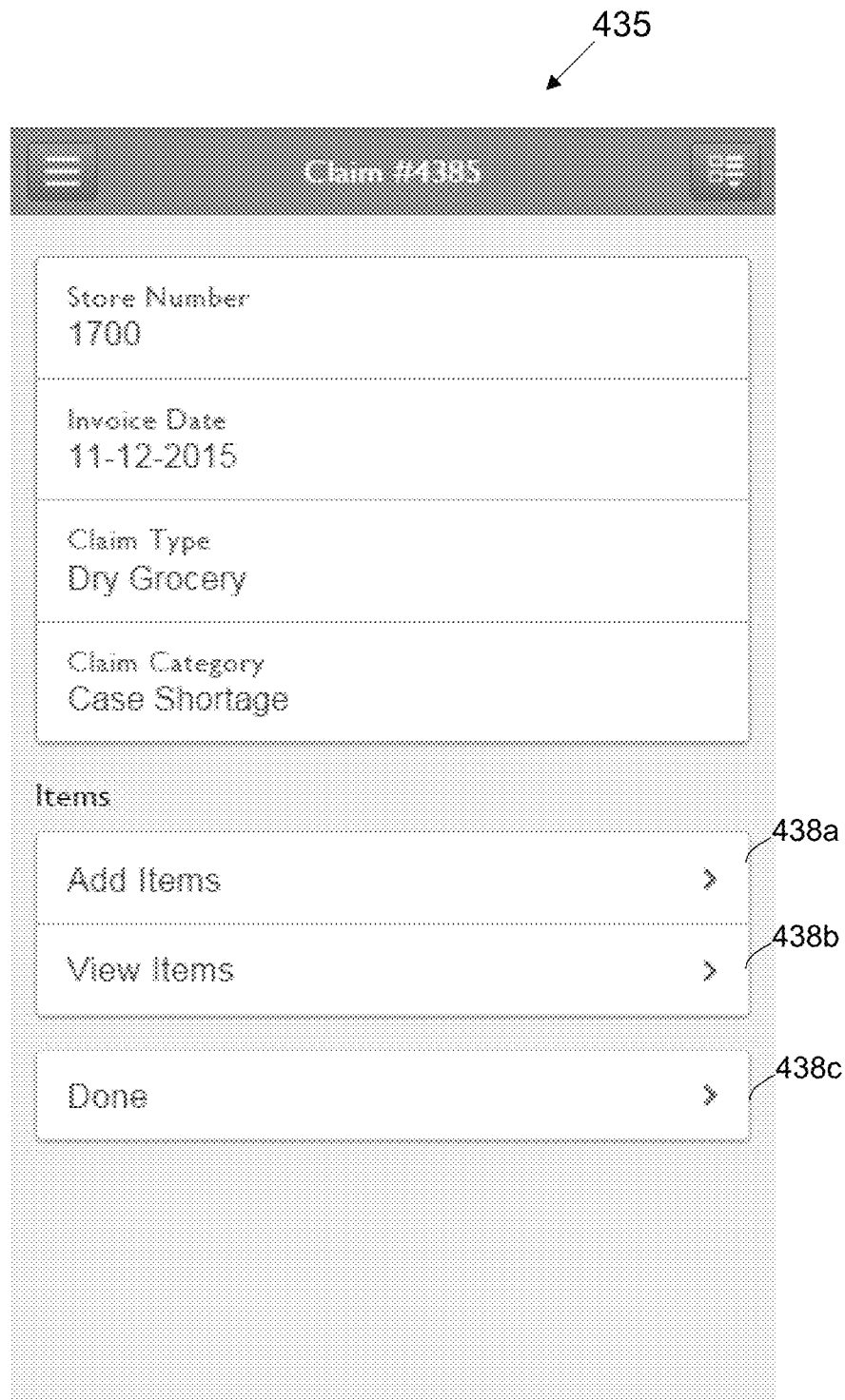
FIG. 4 is a screen shot of an exemplary reimbursement request submission graphical interface of the system of FIG. 1 in accordance with some embodiments.

In the exemplary interface 435 of FIG. 4, the user may use the clickable graphical button 438a to add information associated with the products 190 (i.e., Items) associated with a problem giving rise to the reimbursement request, or may use the clickable graphical button 438b to view the previously added information regarding the products 190 (i.e., Items) associated with the problem giving rise to the reimbursement request. In the embodiment illustrated in FIG. 4, graphical interface 435 also includes a clickable graphical button 438c (i.e., "Done") that permits the user of the retail store electronic device 115 to indicate that the user is done with the entry of the products 190 associated with the problem giving rise to the reimbursement request.

Figure 5:
FIG. 5 is a screen shot of an exemplary reimbursement request submission graphical interface of the system of FIG. 1 in accordance with some embodiments.

FIG. 5 shows an exemplary interface 535 of FIG. 5 that enables the user of the retail store electronic device 115 to enter a product identifier that identifies the product(s) 190 for which the reimbursement request is being submitted, as well as descriptive data identifying a problem or problems giving rise to the reimbursement request. In particular, in the illustrated embodiment, when adding information regarding a product 190 to be included in the reimbursement request, the user of the retail store electronic device 115 is permitted to enter the unique identifier (e.g., serial number (as shown in FIG. 5, i.e., "1234567890"), universal product code (UPC), and/or price look-up code (PLU), or the like) of the product 190 into the text input field 536a of the interface 535. In some embodiments, the retail store electronic device 115 is configured (e.g., by including a product scanner) to scan the product 190 for which the reimbursement request is being submitted. In one aspect, the unique identifier of the product 190 is automatically entered by the retail store electronic device 115 after the user (i.e., worker) scans the product 190 associated with the reimbursement request by using the retail store electronic device 115.

With further reference to FIG. 5, the exemplary interface 535 further includes a text input field 536b that is configured to permit the user of the retail store electronic device 115 (i.e., worker) to indicate a quantity of units (e.g., single unit, a case, or a pallet) of the product 190 affected by the problem giving rise to the reimbursement request. In the exemplary embodiment shown in FIG. 5, the unit for which the reimbursement request is being submitted is a case, and the quantity of units for which the reimbursement request is being submitted is "1."

The exemplary interface 535 of FIG. 5 further includes a text input field 536c configured to permit the user of the retail store electronic device 115 (i.e., worker) to enter "Comments," i.e., descriptive data identifying a problem giving rise to the reimbursement request. In some aspects, the descriptive data identifying a problem giving rise to the reimbursement request may include a written description that the product 190 associated with the reimbursement request is: of below standard quality, damaged, or past its expiration (e.g., "use by" or "sell by") date. In some aspects, the descriptive data identifying a problem giving rise to the reimbursement request may include a written description that a total number of units of the product 190 associated with the reimbursement request delivered to the retail store 110 from the distribution center 120 does not match a total number of units of the product 190 indicated on the electronic invoice associated with that delivery. For example, in some aspects, the descriptive data entered into the text input field 536c may indicate an overage (e.g., that the total number of units of the product 190 delivered to the retail store 110 from the distribution center 120 was greater than the total number of units of the product 190 indicated on the electronic invoice associated with the delivery), or a shortage (e.g., that the total number of units of the product 190 delivered to the retail store 110 from the distribution center 120 was less than the total number of units of the product 190 indicated on the electronic invoice associated with the delivery).

The exemplary interface 535 of FIG. 5 further includes a clickable graphical button 538c (i.e., "Choose File") that enables the user of the retail store electronic device 115 to enter one or more pictures of the issue by uploading photographs of products 190 and/or boxes and/or pallets giving rise to the reimbursement request (e.g., due to poor quality, damage, shortage, overage, mislabels, expired sell by date, etc.). In addition, the exemplary graphical interface 535 illustrated in FIG. 5 includes a clickable graphical "Save" button 538a that enables the user of the retail store electronic device 115 to save the added item/product 190 and a clickable graphical "Cancel" button 538b that enables the user of the retail store electronic device 115 to cancel the addition of the item/product 190.

Figure 6:
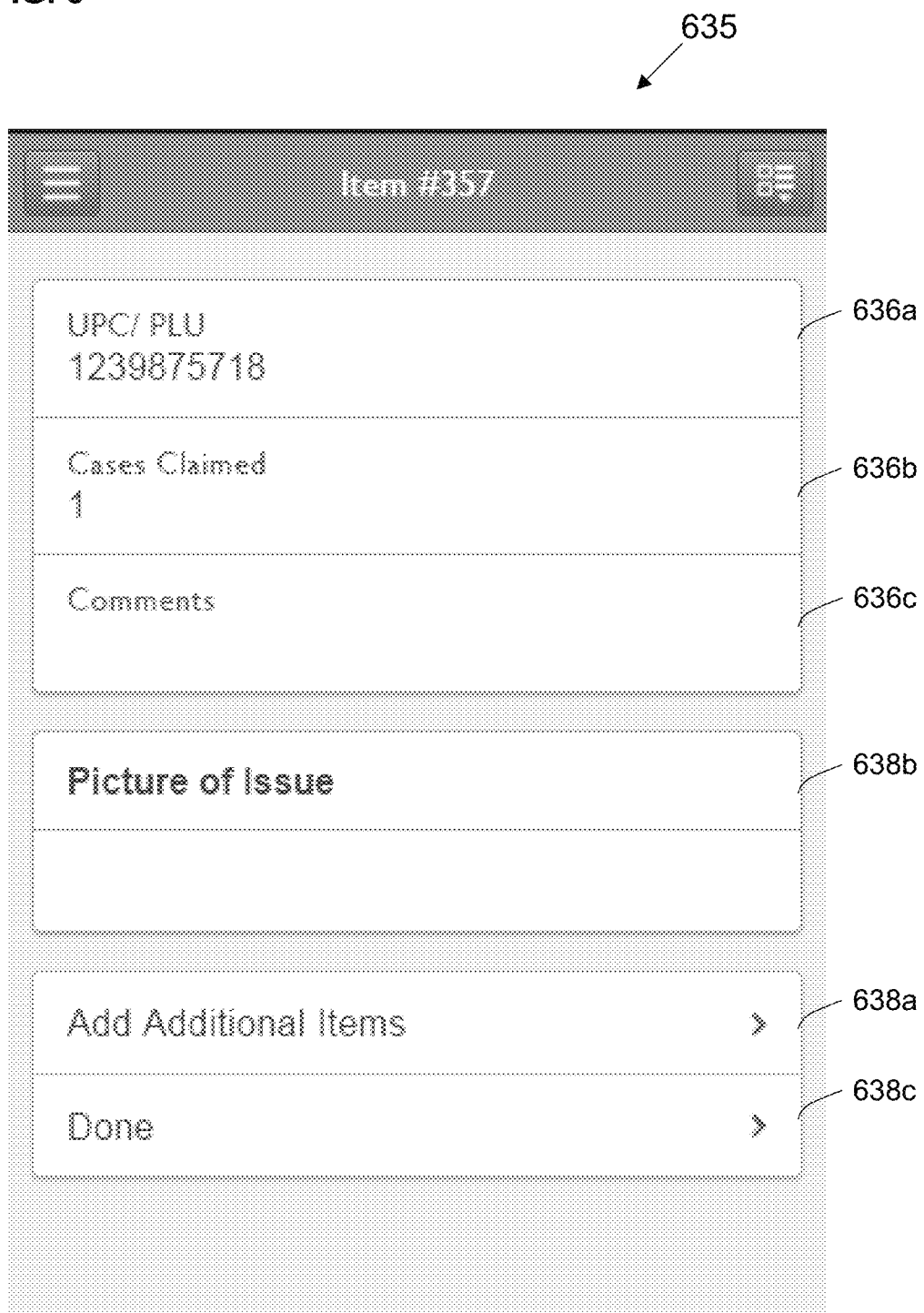
FIG. 6 is a screen shot of an exemplary reimbursement request submission graphical interface of the system of FIG. 1 in accordance with some embodiments.

In the illustrated embodiment, after the user of the retail store electronic device 115 enters the product identifier that identifies the product(s) 190 for which the reimbursement request is being submitted and the comments (i.e., descriptive data) identifying a problem or problems giving rise to the reimbursement request into the graphical interface 535 of FIG. 5, an interface 635 illustrated in FIG. 6 is generated for the user. The exemplary interface 635 of FIG. 6 includes the text input fields that indicate: the unique identifier of the item/product 190 for which the reimbursement request is being submitted (see field 636a); the number of items/products 190 for which the reimbursement request is being submitted (see field 636b), and comments indicating the reasons giving rise to the reimbursement request (see field 636c). The exemplary interface 635 of FIG. 6 also includes clickable field 638b that includes one photographs submitted by the user at the retail store 110 in support of the reimbursement request. In addition, the exemplary interface 635 includes a clickable graphical button 638a to add more products (i.e., Items) associated with a problem giving rise to the reimbursement request and a clickable graphical button 638c that permits the user of the retail store electronic device 115 to indicate that the user is done with the entry of the products 190 associated with the problem giving rise to the reimbursement request.

With reference back to FIG. 4, after the user has entered the unique identifier of the retail store (e.g., Store Number 1700), the date (e.g., Nov. 12, 2015) of the electronic invoice associated with the reimbursement request, the type of products 190 (e.g., Dry Grocery) associated with the reimbursement request, and the reason category (e.g., Case Shortage) for the reimbursement claim, the user of the user of the retail store electronic device 115 is permitted to click the graphical button 438c (e.g., Done) in order to finalize and submit the reimbursement request for review to the claim processing server 130. In some aspects, the graphical interface 435 is configured to permit the user of the retail store electronic device 115 to submit the reimbursement request by clicking the Done button 438c only if the reimbursement request is for a monetary amount that exceeds a predetermined threshold (e.g., $50, $100, $250, $500, $1000, or more). In some embodiments, the graphical interface 435 is configured such that the submission reimbursement request from the retail store electronic device 115 over the network 140 for review to the claim processing server 130 automatically causes one or both of the retail store electronic device 115 and the claim processing server 130 to transmit an electronic alert over the network 140 to an electronic device of a manager of the retail store 110 and/or to an electronic device of an accounting/invoice office at the retail store 110 in order to provide a notification and/or acknowledgment of a submission of a reimbursement request from the retail store 110.

Figure 2:
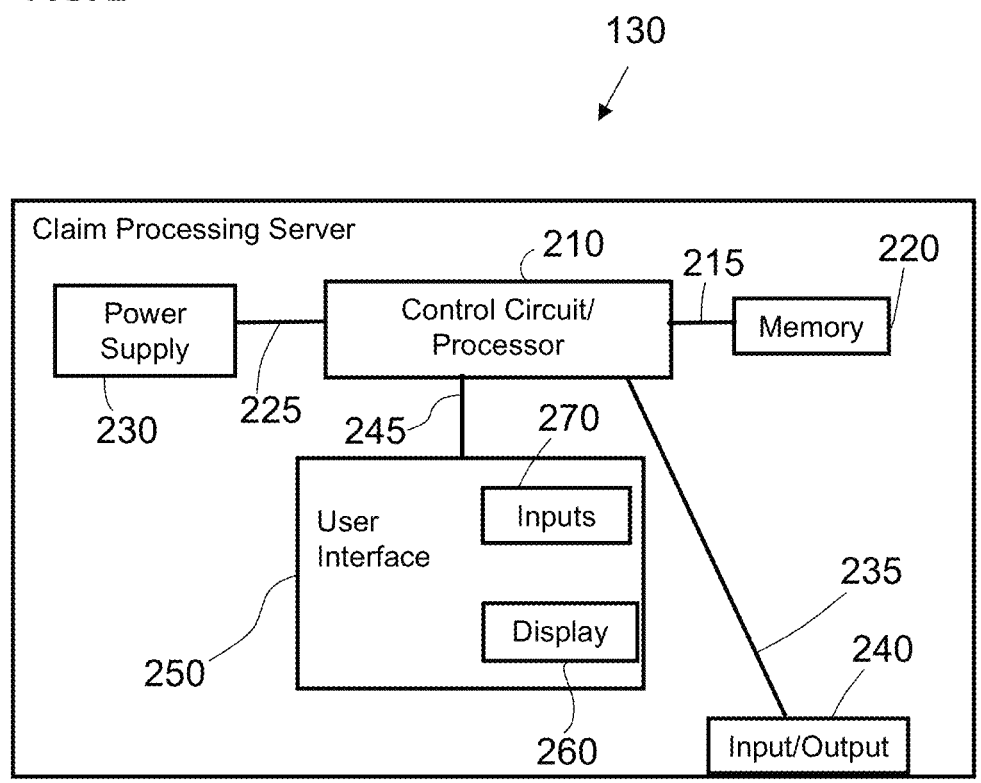
FIG. 2 is a functional diagram of an exemplary claim processing server usable with the system of FIG. 1 in accordance with some embodiments.

With reference to FIG. 2, an exemplary claim processing server 130 configured for use with the systems and methods described herein may include a programmable control circuit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control unit 210 of the claim processing server 130 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the claim processing server 130 is also electrically coupled via a connection 235 to an input/output 240 that can receive signals from electronic devices in communication over the network 140 with the claim processing server 130 (e.g., reimbursement request data submitted via the retail store electronic device 115 or reimbursement request-associated data (e.g., dispute, comments, etc.) received from the distribution center electronic device 125, or any of the electronic databases 150, 160, and 170 illustrated in FIG. 1), or from any other source that can communicate with the claim processing server 130 via a wired or wireless connection. The input/output 240 of the claim processing server 130 can also send signals to electronic devices in communication over the network 140 with the claim processing server 130 (e.g., to send a query for data to the electronic reimbursement claim database 150, electronic inventory management database 160, and/or electronic processed claim database 170 and/or to send a notification to the retail store electronic device 115 and/or to the distribution center electronic device 125), or to any other source that can communicate with the claim processing server 130 via a wired or wireless connection).

In the embodiment shown in FIG. 2, the processor-based control unit 210 of the claim processing server 130 is electrically coupled via a connection 245 to a user interface 250, which may include a visual display or display screen 260 (e.g., LED screen) and/or button input 270 that provide the user interface 250 with the ability to permit an operator of the retailer claim processing server 130 to manually control the claim processing server 130 by inputting commands via touch-screen and/or button operation and/or voice commands to, for example, to establish a set of business rules representing one or more reasons based on which the control circuit 210 is to approve (or deny) the reimbursement request submitted by the retail store 110. In some embodiments, as mentioned above, the reimbursement request approval reasons include one or more of: whether the product 190 associated with the reimbursement request is of below standard quality, whether the product 190 associated with the reimbursement request is damaged; whether the product 190 associated with the reimbursement request is past expiration date; and whether a total number of units of the product 190 associated with the reimbursement request delivered to the retail store 110 from the distribution center 120 does not match a total number of units of the product 190 indicated on the electronic invoice associated with the delivery. It will be appreciated that the performance of such functions by the claim processing server 130 of the claim processing server 130 is not dependent on a human operator, and that the control unit 210 may be programmed to perform such functions without a human operator.

In some embodiments, the display screen 260 of the claim processing server 130 is configured to display various graphical interface-based menus, options, and/or alerts that may be transmitted to the claim processing server 130 and displayed on the display screen 260 in connection with various aspects of the reimbursement request submitted by the retail store 110 against the distribution center 120. The inputs 270 of the claim processing server 130 may be configured to permit an operator to navigate through the on-screen menus on the claim processing server 130 and, for example, mark a reimbursement request as valid or invalid and/or manually to approve or deny a reimbursement request and/or send a notification to distribution center 120 indicating that a reimbursement request has been submitted against that distribution center 120 by the retail store 110. It will be appreciated that the display screen 260 may be configured as both a display screen and an input 270 (e.g., a touch-screen that permits an operator to press on the display screen 260 to enter text and/or execute commands.)

As discussed above, in some aspects, the control circuit 210 of the claim processing server 130 is programmed to generate one or more graphical interfaces 135, 335, 435, 535, and 635 accessible via the claim processing server 130 by the retail store electronic device 115 over the network 140. As discussed above, the exemplary graphical interface 335 is configured (e.g., by including text input fields 336, and/or clickable drop-down menus 337, and/or clickable graphical buttons 338) to permit the user of the retail store electronic device 115 to submit reimbursement requests based on one or more reasons for such reimbursement requests.

In some embodiments, after a reimbursement request has been submitted by a user of the retail store electronic device 115 against a distribution center 120 as described above, the control circuit 210 of the claim processing server 130 is programmed to analyze the reimbursement request data submitted by the retail store electronic device 115, and to associate the reimbursement request data with an electronic invoice stored in the electronic inventory management database 160. In some aspects, the control circuit 210 of the claim processing server 130 is programmed to analyze to associate the reimbursement request data with an electronic invoice stored in the electronic inventory management database 160 by attempting to match the unique identifier 192 (e.g., serial number, UPC, etc.) submitted in the reimbursement request against the unique identifiers of products identified on electronic invoices stored in the inventory management database 160. In one aspect, the control circuit 210 of the claim processing server 130 is programmed to attempt to generate multiple (e.g., 3, 5, 7, 9, etc.) combinations of the unique identifier 192 submitted in the reimbursement request and then search the indexed information in the inventory management database 160 for an electronic invoice that includes the product 190 associated with the unique identifier being searched. In some aspects, after the reimbursement request data is associated with an electronic invoice stored in inventory management database 160, a user at the distribution center 120 is permitted to access the electronic inventory management database 160 to retrieve and/or view information pertaining to the reimbursement request using the distribution center electronic device 125.

In some embodiments, after a reimbursement request has been submitted by a user of the retail store electronic device 115 against a distribution center 120 as described above, the control circuit 210 of the claim processing server 130 is programmed to perform several steps in order to arrive at a decision of whether to approve or deny the reimbursement request, as well as, in some aspects, to calculate, for a granted reimbursement request, a reimbursement amount owed to the retail store 110 by the distribution center 120, and to generative a corrected invoice based on this calculation. In some embodiments, the control circuit 210 of the claim processing server 130 is programmed to determine if the reimbursement request by the retail store 110 is eligible for submission i.e., whether the reimbursement request was submitted within a predetermined acceptable time frame (e.g., 1 day, 2 days, 3 days, 5 days, 7 days, 30 days, etc.) after the delivery to the retail store 110 that gave rise to the reimbursement request. In one aspect, after the control circuit 210 determines that a reimbursement request by the retail store 110 was submitted after the predetermined acceptable time frame (e.g., 3 days) from the time of delivery has elapsed, the control circuit 210 is programmed to transmit a response to the retail store electronic device 115 indicating (e.g., via an appropriate reason code) that the reimbursement request has been denied because it was not timely submitted by the retail store 110, and to send a signal to the electronic processed claim database 170 to record this denial for future reference.

In some embodiments, after the control circuit 210 of the claim processing server 130 determines that the reimbursement request by the retail store 110 was submitted within the predetermined acceptable period of time, the control circuit 210 is configured to obtain, from the electronic reimbursement claim database 150 the product identifier 192 of the product 190 associated with the reimbursement request submitted via the retail store electronic device 115. In addition, in some embodiments, the control circuit 210 is configured to obtain, from the electronic inventory management database 160 and based on the obtained electronic product identifier 192, an electronic invoice matched (as described above) with the product 190 associated with the reimbursement request submitted via the retail store electronic device 115.

Further, in some aspects, the control circuit 210 is configured to obtain, from the electronic reimbursement claim database 170, a set of business rules representing at least one reason based on which the control circuit 210 is programmed to approve (or deny) the reimbursement request. As discussed above, the reimbursement request approval reasons include whether the product 190 associated with the reimbursement request is of below standard quality, whether the product 190 associated with the reimbursement request is damaged; whether the product 190 associated with the reimbursement request is past expiration date; and whether a total number of units of the product 190 associated with the reimbursement request delivered to the retail store 110 from the distribution center 120 does not match a total number of units of the product 190 indicated on the electronic invoice associated with the delivery.

After the control circuit 210 of the claim processing server 130 obtains the business rules that govern the reasons based on which a reimbursement request is to be approved or denied, in some embodiments, the control circuit 210 is programmed to analyze the obtained business rules and determine (1) that the reimbursement request submitted by the retail store electronic device 115 is to be approved when a predetermined number (e.g., 1, 2, 3, 4, 5, or more) of the reimbursement request approval reasons is met; or (2) that the reimbursement request submitted by the retail store electronic device 115 is to be denied when the predetermined number (e.g., 1, 2, 3, 4, 5, or more) of the reimbursement request approval reasons is not met. In some embodiments, the control circuit 210 is programmed to weigh some of the reimbursement request approval reasons differently than others in that, in some aspects, a single reimbursement request approval reason (e.g., "Overage"), if met, is sufficient to cause the control circuit 210 to approve the reimbursement request, while in other aspects, two or more reimbursement request approval reasons must be met in order to cause the control circuit 210 to approve the reimbursement request.

In some aspects, in response to a determination by the control circuit 210 of the claim processing server 130 that the reimbursement request is to be approved, the control circuit 210 of the claim processing server 130 is programmed to generate a corrected invoice directed to the distribution center 120. The corrected invoice may, for example, indicate a monetary amount to be credited to or debited from the account of the retail store 110 and/or the distribution center 120 based on the processing of the reimbursement request by the control circuit 210. In some aspects, the control circuit 210 is programmed to calculate a reimbursement/refund amount to the retail store 110 based on the total price (indicated on the original electronic invoice) paid by the retail store 110 to the distribution center 120 for the products 190 that were damaged and submitted in the reimbursement request.

In some embodiments, in response to a determination by the control circuit 210 of the claim processing server 130 that the reimbursement request submitted by the retail store 110 against a distribution center 120 is to be approved, the control circuit 210 of the claim processing server 130 is programmed to transmit a communication over the network 140 to the retail store electronic device 115 indicating that the reimbursement request has been approved. Conversely, in response to a determination by the control circuit 210 of the claim processing server 130 that the reimbursement request submitted by the retail store 110 against a distribution center 120 is to be denied, the control circuit 210 of the claim processing server 130 is programmed to generate an electronic notification indicating that the reimbursement request has been denied and transmit over the network 140 the electronic notification including an indication that the reimbursement request has been denied to the retail store electronic device 115. In one aspect, the denial notification transmitted by the claim processing server 130 to the retail store electronic device 115 indicates an appropriate reason code that corresponds to one or more specific reasons as to why the reimbursement request has been denied.

In some embodiments, after the control circuit 210 of the claim processing server 130 determines that a reimbursement request submitted by a retail store against a distribution center 120 is approved and transmits the notification of reimbursement request approval to the distribution center 120, the claim processing server 130 permits the distribution center to 120 comment on and/or dispute the approval of the reimbursement request, as well as to propose modifications to the corrected invoice. To that end, in one aspect, the notification of reimbursement request approval transmitted over the network 140 from the claim processing server 130 includes a graphical text input field the enables a user at the distribution center 120, using the distribution center electronic device 125, to prepare a written submission in support of a denial of the reimbursement request approved by the claim processing server 130 and/or a modification of the corrected invoice directed to the distribution center 120.

In some embodiments, the electronic reimbursement claim database 150 is configured to store reimbursement requests only temporarily, i.e., until their resolution (e.g., approval or denial) by the claim processing server 130. In other words, in some aspects, in response to the determination by the control circuit 210 that the reimbursement request is to be approved, the control circuit 210 is programmed to transmit a control signal over the network 140 to the electronic reimbursement claim database 150 in order to purge the reimbursement request from the electronic reimbursement claim database 150, thereby advantageously freeing up storage space on the reimbursement claim database 150.

In some aspects, in response to a determination by the control circuit 210 of the claim processing server 130 that the reimbursement request is to be approved, the control circuit 210 of the claim processing server 130 is programmed to further generate event data indicating approval of the reimbursement request and the generation of the corrected invoice directed to the distribution center 120, as well as to transmit an electronic notification (i.e., alert) including the corrected invoice over the network 140 to the distribution center electronic device 125. In one aspect, the control circuit 210 of the claim processing server 130 is programmed to also transmit the generated event data to the electronic processed claim database 170 for storage and subsequent retrieval. For example, in some embodiments, the control circuit 210 of the claim processing server 130 is programmed to access the electronic processed claim database 170 over the network 140 in order to retrieve the event data from the electronic processed claim database 170, and to generate a report indicating each reimbursement request submitted by the retail store 110 against one or more of the distribution centers 120 that delivered products 190 to the retail store 110. Such reports may be used by the retail store 110, for example, as metrics to analyze the quality of the deliveries coming from one or more distribution centers 120 associated with the retail store 110.

As described above, some of the conditions/reasons that may give rise to a submission of a reimbursement request by the retail store 110 include but are not limited to poor quality of the delivered products 190; the delivered products 190 are delivered in a damaged condition, the delivered products 190 are past their expiration date, damage, the delivered products 190 are mislabeled, the number of delivered products 190 actually delivered to the retail store 110 is less than the number of delivered products 190 indicated on the electronic invoice to the retail store 110, or the number of delivered products 190 actually delivered to the retail store 110 is greater than the number of delivered products 190 indicated on the electronic invoice to the retail store 110. Each of these conditions/reasons affects the on-hand inventory of the retail store 110. For example, if a case of 12 units of a cereal product is delivered to the retail store 110 in a damaged condition, the on-hand inventory of the retail store 110 will be off by 12 units of the cereal product, since these 12 units, while in stock, cannot be sold by the retail store 110 to the customers.

Accordingly, in some embodiments, the control circuit 210 of the claim processing server 130 is further configured, after an approval of the reimbursement request and generation of the corrected invoice, to transmit a signal to the electronic inventory management database 160 to update at least one of perpetual inventory data and accounting data associated with the retail store 110. As a result, the perpetual inventory of the retail store 110 is adjusted to reflect the damage to the 12 units of the product 190 and to correctly reflect the actual on-hand inventory of the product 190 at the retail store 110 resulting from the damage during delivery. In other words, in the example above, the control circuit 210 would automatically reduce the number of units of the product 190 on-hand at the retail store 110 by 12 while also updating the accounting data that the retail store 110 is to receive a credit from the distribution center 120 in an amount equal to the price of 12 units of the product 190. The update to perpetual inventory is advantageous especially in relation to grocery and other perishable products 190 delivered to the retail store 110.

FIG. 7 shows an embodiment of an exemplary method 700 of processing submission of reimbursement requests submitted by retail stores 110 to distribution centers 120 responsible for delivering products 190 to the retail stores 110. The method 700 includes providing one or more retail store electronic devices 115 configured to permit a worker of a retail store 110 to submit a reimbursement request in association with one or more products 190 delivered to the retail store 110 from a distribution center 120 (step 710). As described above, in some embodiments, the reimbursement request includes a product identifier 192 that identifies a product 190 for which the reimbursement request is being submitted, as well as descriptive data identifying a problem (e.g., poor quality, damage, shortage, overage, mislabels, expired sell by date, etc.) giving rise to the reimbursement request. In some aspects, the product identifier 192 (e.g., serial number, UPC, PLU, or the like) is obtained by the worker of the retail store 110 via scanning the product 190 using the retail store electronic device 115.

The exemplary method 700 further includes providing an electronic reimbursement claim database 150 in communication over a network 140 with the retail store electronic device 115 and configured to receive the reimbursement request submitted via the retail store electronic device 115 (step 720). As described above, the electronic reimbursement claim database 150 may be configured to permanently or temporarily store the reimbursement requests submitted by the retail stores 110 against the distribution centers 120. In addition, as pointed out above, in some embodiments, the electronic reimbursement claim database 150 is configured to store configuration tables and/or business rules representing at least one reason based on which the control circuit 210 may approve or deny the reimbursement request.

The method 700 further includes providing an electronic inventory management database 160 configured to store electronic invoices associated with the products 190 delivered to the retail store 110 (step 730) and providing a processed claim database 170 configured to store data associated with processed reimbursement requests (step 740). As described above, in some embodiments, the inventory management database 160, in addition to the electronic invoice information that reflects the products 190 delivered to the retail store 110 from the distribution center 120, also stores information (e.g., perpetual inventory data) regarding the products 190 on-hand at the retail store 110 and information regarding the products purchased by customers from the retail store 110.

The exemplary method 700 illustrated in FIG. 7 further includes providing an electronic claim processing server 130 including a processor-based control circuit 210 and configured for communication with the electronic reimbursement claim database 150 over the network 140 (step 750). As described above, in some embodiments, the claim processing server 130 enables the users of the retail store electronic devices 115 associated with the retail stores 110 to enter electronic data pertaining to their reimbursement requests (based on various delivery-associated and/or product-associated deficiencies that may be attributable by the retail stores 110 to the distribution centers 120) by generating an internet-based form (i.e., graphical interface 135) accessible by the workers of the retail stores 110 via retail store electronic devices 115 that are logged in to the claim processing server 130.

In addition, in some aspects, after a reimbursement request has been submitted by a user of the retail store electronic device 115 against a distribution center 120 as described above, the control circuit 210 of the claim processing server 130 is programmed to perform several steps in order to analyze various factors and arrive at a decision of whether to approve or deny the reimbursement request and to calculate, for a granted reimbursement request, a reimbursement amount owed to the retail store 110 by the distribution center 120, and to generative a corrected invoice based on this calculation. To that end, the exemplary method 700 includes obtaining, via the claim processing server 130, electronic information that enables the claim processing server 130 to perform such analysis. In particular, the method 700 includes the steps of: obtaining, via the claim processing server 130, from the electronic reimbursement claim database 150, the product identifier 192 of the product 190 associated with the reimbursement request submitted via the retail store electronic device 115 (step 760); obtaining, via the claim processing server 130, from the electronic inventory management database 160 and based on the obtained electronic identifier 192, an electronic invoice associated with the product 190 associated with the reimbursement request submitted via the retail store electronic device 115 (step 770); and obtaining, via the claim processing server 130, from the electronic reimbursement claim database 170, a set of business rules representing at least one reason based on which the control circuit 210 is configured to approve the reimbursement request (step 780).

As described above, the reimbursement request approval reasons based on one or more of which the claim processing server 130 will approve or deny the reimbursement request include: whether the product 190 associated with the reimbursement request is of below standard quality, whether the product 190 associated with the reimbursement request is damaged; whether the product 190 associated with the reimbursement request is past expiration date; and whether a total number of units of the product 190 associated with the reimbursement request delivered to the retail store 110 from the distribution center 120 does not match (e.g., is greater than or less than) a total number of units of the product 190 indicated on the electronic invoice associated with the delivery to the retail store 110 from the distribution center 120. To that end, in the illustrated embodiment, the method 700 includes determining, via analysis of the obtained business rules by the control circuit of the claim processing server 130, that the reimbursement request submitted via the retail store electronic device 115 is to be approved when a predetermined number (e.g., 1, 2, 3, 4, 5, or more) of the reimbursement request approval reasons is met (step 780).

As mentioned above, in some embodiments, in addition to being programmed to determine, based on a predetermined set of business rules, whether the reimbursement request is to be approved or denied, the control circuit 210 of the claim processing server 130 is programmed to generate a corrected invoice directed to the distribution center 120 in the event that the reimbursement request is approved by the control circuit 210. To that end, in some aspects, the method 700 includes generating, in response to a determination by the control circuit 210 that the reimbursement request is to be approved, a corrected invoice directed to the distribution center 120. In one aspect, the method 700 further includes generating event data indicating approval of the reimbursement request and the generation of the corrected invoice directed to the distribution center 120 and transmitting, from the claim processing server 130, an alert including the corrected invoice over the network 140 to a distribution center electronic device 125; and transmitting, from the claim processing server 130, the event data to the electronic processed claim database 170 for storage and/or future retrieval.

The corrected invoice generated by the control circuit 210 may, for example, indicate a monetary amount to be credited to or debited from the account of the retail store 110 and/or the distribution center 120 based on the approval of the reimbursement request by the control circuit 210. In some aspects, the control circuit 210 calculates a reimbursement/refund amount to the retail store 110 based on the total price (indicated on the original electronic invoice) paid by the retail store 110 to the distribution center 120 for the products 190 that were submitted in the reimbursement request. In some aspects, the event data generated by the control circuit indicates whether each reimbursement request submitted through the system 100 has been approved or denied by the claim processing server 130, and whether a corrected invoice was generated based on the approval of a given reimbursement request. Such event data, when stored in the processed claim database 170, may be retrieved at a later time (e.g., by a worker at the retail store 110, by a worker at the distribution center 120, by an operator of the claim processing server 130, etc.) and used as metrics to analyze, for example: the reimbursement request success percentage of a given retail store 110, most common reasons why a reimbursement request is submitted by the retail store 110, most common reasons why a reimbursement request is denied by the claim processing server 130, etc.

The systems and methods described herein advantageously allow retail stores to easily submit reimbursement requests against distribution centers, enable automatic approval or denial of such reimbursement requests based on a predetermined set of business rules, calculate the reimbursement amounts owed, and generate corrective invoices. Such systems and methods provide retail stores and distribution centers with significant time and operation cost savings.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing reimbursement requests by retail stores to distribution centers responsible for delivering products to the retail stores, the system comprising:

at least one electronic device configured to permit a worker of a retail store to submit a reimbursement request in association with a product delivered to the retail store from a distribution center, the reimbursement request including a product identifier that identifies the product for which the reimbursement request is being submitted and descriptive data identifying a problem giving rise to the reimbursement request;

an electronic reimbursement claim database in communication over a network with the at least one electronic device and configured to receive the reimbursement request submitted via the at least one electronic device;

an electronic inventory management database configured to store electronic invoices associated with the product delivered to the retail store from the distribution center;

an electronic processed claim database configured to store data associated with processed reimbursement requests; and a claim processing server including a processor-based control circuit and configured for communication with the electronic reimbursement claim database over the network, the claim processing server being configured to:
- obtain, from the electronic reimbursement claim database, the product identifier of the product associated with the reimbursement request submitted via the at least one electronic device;
- obtain, from the electronic inventory management database and based on the obtained electronic identifier, an electronic invoice associated with the product associated with the reimbursement request submitted via the at least one electronic device;
- obtain, from the electronic reimbursement claim database, a set of business rules representing at least one reason based on which the control circuit is configured to approve the reimbursement request, the reimbursement request approval reasons including at least one of: whether the product associated with the reimbursement request is of below standard quality, whether the product associated with the reimbursement request is damaged; whether the product associated with the reimbursement request is past expiration date; whether a total number of units of the product associated with the reimbursement request delivered to the retail store from the distribution center does not match a total number of units of the product indicated on the electronic invoice;
- analyze the obtained business rules and determine that the reimbursement request submitted via the at least one electronic device is to be approved when at least one of the reimbursement request approval reasons is met;
- in response to a determination by the control circuit that the reimbursement request is to be approved, generate:
  - a corrected invoice associated with approved reimbursement request and directed to the distribution center; and
  - event data indicating approval of the reimbursement request and the generation of the corrected invoice directed to the distribution center;
- transmit an alert including the corrected invoice associated with the approved reimbursement request over the network to a computing device of the distribution center; and
- transmit the event data to the electronic processed claim database for storage.

2. The system of claim 1, wherein the at least one electronic device is configured to generate a graphical interface including a plurality of fillable input fields configured to permit the worker to generate the reimbursement request.

3. The system of claim 2, wherein the graphical interface is configured to permit the user of the at least one electronic device to submit the reimbursement request only if the reimbursement request is for a monetary amount that exceeds a predetermined threshold.

4. The system of claim 2,
wherein the at least one electronic device is configured to scan the product for which the reimbursement request is being submitted; and
wherein the graphical interface includes at least one input field configured to permit the worker to indicate a quantity of units of the product affected by the problem giving rise to the reimbursement request.

5. The system of claim 1, wherein the control circuit is further configured, in response to the determination by the control circuit that the reimbursement request is to be approved, to transmit a communication to the at least one electronic device of the worker at the retail store indicating that the reimbursement request has been approved.

6. The system of claim 1, wherein the control circuit is further configured, after an approval of the reimbursement request and generation of the corrected invoice, to transmit a signal to the electronic inventory management database to update at least one of perpetual inventory data and accounting data associated with the retail store.

7. The system of claim 1, wherein the claim processing server is configured to:
- access the electronic processed claim database over the network;
- retrieve the event data from the electronic processed claim database; and
- generate a report indicating each reimbursement request submitted by the retail store against one or more of the distribution centers that delivered the product to the retail store.

8. The system of claim 1, wherein the claim processing server is configured to receive a transmission over the network from the computing device of the distribution center, the transmission including a written submission in support of at least one of: a denial of the reimbursement request approved by the claim processing server; and a modification of the corrected invoice directed to the distribution center.

9. The system of claim 1, wherein the control circuit is further configured to:
- generate, in response to a determination by the control circuit that the reimbursement request is to be denied, an electronic notification indicating that the reimbursement request has been denied; and
- transmit the electronic notification including an indication that the reimbursement request has been denied to the at least one electronic device at the retail store.

10. The system of claim 1, wherein, in response to the determination by the control circuit that the reimbursement request is to be approved, the control circuit is further configured to transmit a control signal over the network to the electronic reimbursement claim database, the control signal configured to purge the reimbursement request from the electronic reimbursement claim database.

11. A method of processing submission of reimbursement requests submitted by retail stores to distribution centers responsible for delivering products to the retail stores, the method comprising:
- providing at least one electronic device configured to permit a worker of a retail store to submit a reimbursement request in association with a product delivered to the retail store from a distribution center, the reimbursement request including a product identifier that identifies the product for which the reimbursement request is being submitted and descriptive data identifying a problem giving rise to the reimbursement request;
- providing an electronic reimbursement claim database in communication over a network with the at least one electronic device and configured to receive the reimbursement request submitted via the at least one electronic device;

providing an electronic inventory management database configured to store electronic invoices associated with the product delivered to the retail store from the distribution center;

providing a processed claim database configured to store data associated with processed reimbursement requests;

providing an electronic claim processing server including a processor-based control circuit and configured for communication with the electronic reimbursement claim database over the network;

obtaining, via the claim processing server and from the electronic reimbursement claim database, the product identifier of the product associated with the reimbursement request submitted via the at least one electronic device;

obtaining, via the claim processing server and from the electronic inventory management database and based on the obtained electronic identifier, an electronic invoice associated with the product associated with the reimbursement request submitted via the at least one electronic device;

obtaining, via the claim processing server and from the electronic reimbursement claim database, a set of business rules representing at least one reason based on which the control circuit is configured to approve the reimbursement request, the reimbursement request approval reasons including at least one of: whether the product associated with the reimbursement request is of below standard quality, whether the product associated with the reimbursement request is damaged; whether the product associated with the reimbursement request is past expiration date; whether a total number of units of the product associated with the reimbursement request delivered to the retail store from the distribution center does not match a total number of units of the product indicated on the electronic invoice;

determining, via analysis by the control circuit of the obtained business rules, that the reimbursement request submitted via the at least one electronic device is to be approved when at least one of the reimbursement request approval reasons is met;

in response to a determination by the control circuit that the reimbursement request is to be approved, generating:

a corrected invoice associated with approved reimbursement request and directed to the distribution center; and event data indicating approval of the reimbursement request and the generation of the corrected invoice directed to the distribution center;

transmitting, from the claim processing server, an alert including the corrected invoice associated with the approved reimbursement request over the network to a computing device of the distribution center; and transmitting, from the claim processing server, the event data to the electronic processed claim database for storage.

12. The method of claim 11, wherein the providing of the at least one electronic device further comprises generating a graphical interface including a plurality of fillable input fields configured to permit the worker to generate the reimbursement request.

13. The method of claim 12, further comprising, permitting the user of the at least one electronic device to submit the reimbursement request via the graphical interface only if the reimbursement request is for a monetary amount that exceeds a predetermined threshold.

14. The method of claim 12, further comprising:

scanning, via the at least one electronic device, the product for which the reimbursement request is being submitted; and providing within the graphical interface at least one input field configured to permit the worker to indicate a quantity of units of the product affected by the problem giving rise to the reimbursement request.

15. The method of claim 11, further comprising, in response to the determination by the control circuit that the reimbursement request is to be approved, transmitting from the claim processing server a communication to the at least one electronic device of the worker at the retail store indicating that the reimbursement request has been approved.

16. The method of claim 11, further comprising, after an approval of the reimbursement request and generation of the corrected invoice, transmitting from the claim processing server a signal to the electronic inventory management database to update at least one of perpetual inventory data and accounting data associated with the retail store.

17. The method of claim 11, further comprising:

accessing, via the claim processing server, the electronic processed claim database over the network;

retrieving, via the claim processing server, the event data from the electronic processed claim database; and generating, via the claim processing server, a report indicating each reimbursement request submitted by the retail store against one or more of the distribution centers that delivered the product to the retail store.

18. The method of claim 11, further comprising receiving, at the claim processing server, a transmission over the network from the computing device of the distribution center, the transmission including a written submission in support of at least one of: a denial of the reimbursement request approved by the claim processing server; and a modification of the corrected invoice directed to the distribution center.

19. The method of claim 11, further comprising:

generating, via the control circuit and in response to a determination by the control circuit that the reimbursement request is to be denied, an electronic notification indicating that the reimbursement request has been denied; and transmitting from the claim processing server the electronic notification including an indication that the reimbursement request has been denied to the at least one electronic device at the retail store.

20. The method of claim 11, further comprising, in response to the determination by the control circuit that the reimbursement request is to be approved, transmitting, via the control circuit, a control signal over the network to the electronic reimbursement claim database, the control signal configured to purge the reimbursement request from the electronic reimbursement claim database.

* * * * *